(12) United States Patent
Lai

(10) Patent No.: US 9,435,932 B2
(45) Date of Patent: Sep. 6, 2016

(54) LIGHT GUIDE PLATE, METHOD OF MANUFACTURING SAME, AND BACKLIGHT MODULE HAVING SAME

(71) Applicant: HON HAI PRECISION INDUSTRY CO., LTD., New Taipei (TW)

(72) Inventor: Chih-Chen Lai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 223 days.

(21) Appl. No.: 13/949,250

(22) Filed: Jul. 24, 2013

(65) Prior Publication Data

US 2014/0376264 A1    Dec. 25, 2014

(30) Foreign Application Priority Data

Jun. 21, 2013   (TW) .................................. 102122067

(51) Int. Cl.
*F21V 8/00* (2006.01)

(52) U.S. Cl.
CPC ........... *G02B 6/0043* (2013.01); *G02B 6/0036* (2013.01); *G02B 6/0051* (2013.01); *G02B 6/0065* (2013.01)

(58) Field of Classification Search
CPC   G02B 6/0043; G02B 6/0036; G02B 6/0051; G02B 6/0065

USPC .................................. 362/615, 616, 617, 619
See application file for complete search history.

(56) References Cited

U.S. PATENT DOCUMENTS

| 2011/0222295 A1* | 9/2011 | Weber ...................... B32B 7/02 362/296.01 |
| 2012/0170314 A1* | 7/2012 | Chang et al. .................. 362/613 |

* cited by examiner

*Primary Examiner* — Karabi Guharay
*Assistant Examiner* — Meghan Ulanday
(74) *Attorney, Agent, or Firm* — Zhigang Ma

(57) ABSTRACT

A light guide plate includes a main body including a light emitting surface. A number of glues, each with a different, and lower, refractive index when cured, are applied through a covering plate onto the light emitting surface. Each type of glue forms a layer on the layer below, the stack of layers forms a plurality of spaced micro-rods on the light emitting surface. Each layer in the micro-rod thus includes top and bottom and side surfaces. The different refraction indexes of each layer, reducing along a direction from the light emitting surface to the top surface of each rod, causes light to be emitted substantially equally from the periphery of each layer in the micro-rod as well as from the top of each rod. The maximum refraction index of any layer in the micro-rod is not greater than that of the main body.

6 Claims, 4 Drawing Sheets

LIGHT GUIDE PLATE, METHOD OF MANUFACTURING SAME, AND BACKLIGHT MODULE HAVING SAME

BACKGROUND

1. Technical Field

The present disclosure relates to a light guide plate, a method of manufacturing the light guide plate, and a backlight module including the light guide plate.

2. Description of Related Art

A backlight module includes a light guide plate. A refraction index of the light guide plate is about 1.5. The light guide plate includes a light emitting surface. According to Snell's refraction law, $n_1 \times \sin\theta_1 = n_0 \times \sin 90°$, wherein $n_1$ is the refraction index of the light guide plate and is equal to 1.5, $\theta_1$ is a total reflection angle of the light transmitted in the light guide plate, $n_0$ is a refraction index of air and is equal to 1, it can be calculated that $\theta_1$ is equal to 41.8°. Thus, when reaching the light emitting surface, light having an incident angle bigger than 41.8° will be totally reflected and not emitted out of the light emitting surface. Thus, it reduces light emitting efficiency of the light guide plate.

Therefore, it is desirable to provide a light guide plate, a method of manufacturing the light guide plate, and a backlight module having the light guide plate which can overcome the limitations described.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

Figure 1:
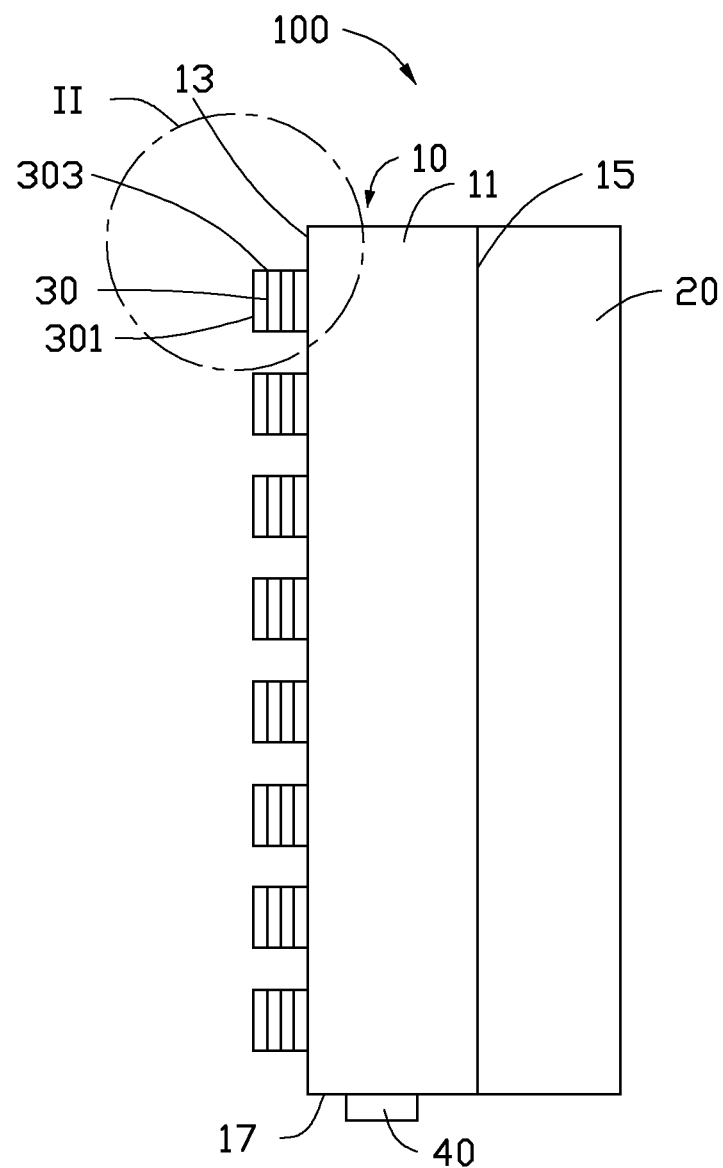
FIG. 1 is a schematic view of a backlight module according to a first embodiment of the present disclosure.
Figure 2:
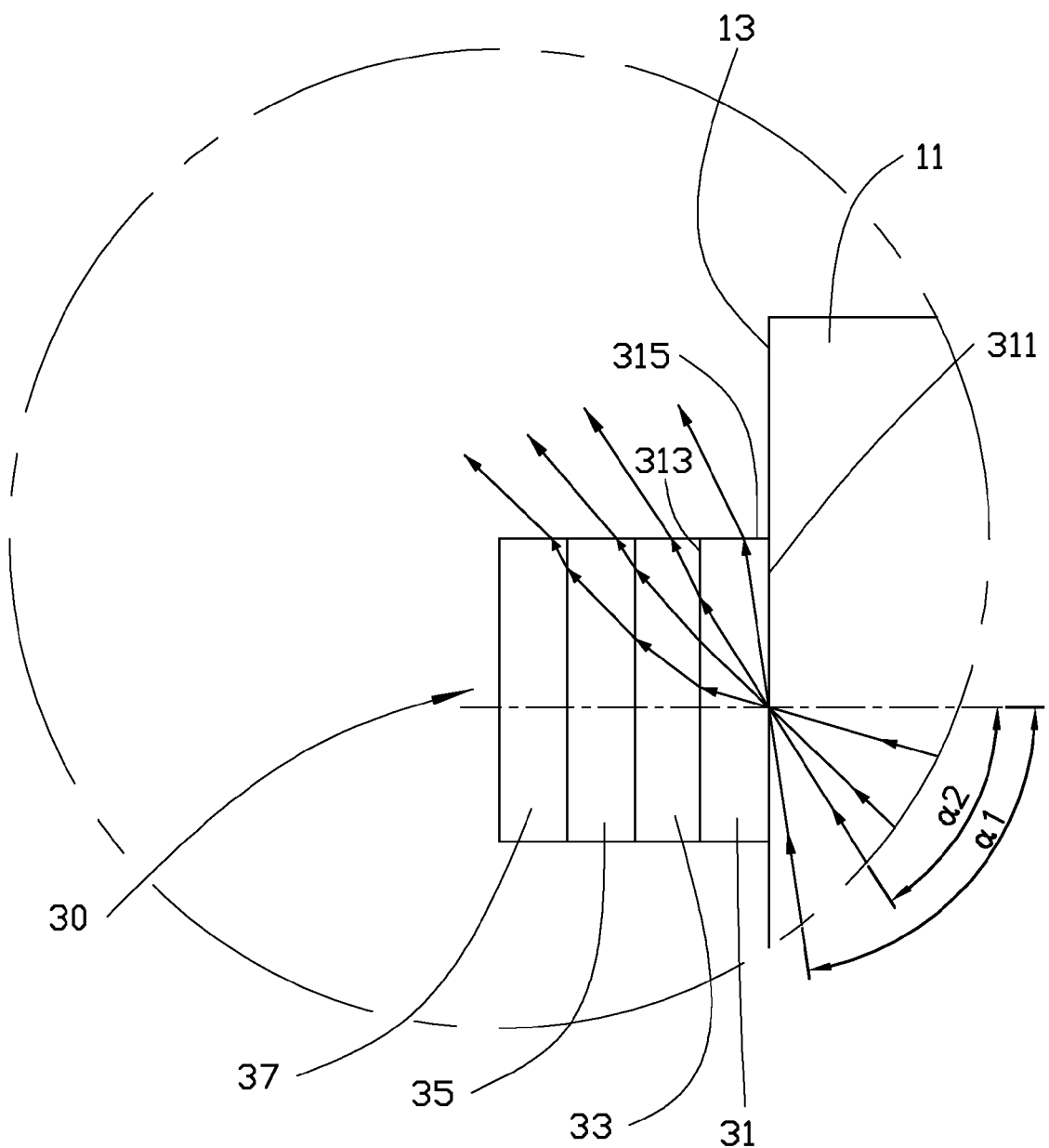
FIG. 2 is an enlarged view of a circled portion II of FIG. 1.

FIGS. 1 and 2 show a backlight module 100 according to an exemplary embodiment of the present disclosure. The backlight module 100 includes a light guide plate 10, a reflection plate 20, and a light source 40. In this embodiment, the light source 40 is a light emitting diode (LED).

The light guide plate 10 includes a main body 11 made of transparent resin, such as polymethyl methacrylate (PMMA). A refraction index $n_1$ of the main body 11 is about 1.5. The main body includes a light emitting surface 13, a bottom surface 15 opposite to the light emitting surface 13, and a light incident surface 17 connecting the light emitting surface 13 to the bottom surface 15. The light source 40 is adjacent to the light incident surface 17.

The reflection plate 20 is adjacent to and in contact with the bottom surface 15. The reflection plate 20 reflects light back into the light guide plate 10. The reflection plate 20 is made of reflective material, such as aluminum.

The light guide plate 10 further includes a number of spaced micro-rods 30 formed on the light emitting surface 13. In this embodiment, the micro-rods 30 are round. Each of the micro-rods 30 includes a side surface 303 connected to and perpendicular to the light emitting surface 13 and a top surface 301 on a distal end of the micro-rod 30.

Each of the micro-rods 30 includes a number of layers arranged in order, from the light emitting surface 13 to the top surface 301. In this embodiment, each of the micro-rods 30 includes a first layer 31, a second layer 33, a third layer 35, and a fourth layer 37. The first layer 31 includes a first end surface 311, a second end surface 313, and a side surface 315. The first end surface 311 and the second end surface 313 are parallel to the light emitting surface 13. The first end surface 311 is in contact with the light emitting surface 13. The second end surface 313 is far away from the light emitting surface 13 relative to the first end surface 311. The side surface 315 connects the first end surface 311 to the second end surface 313. The side surface 315 is perpendicular to the light emitting surface 13. The side surface 315 is a part of the side surface 303. The second layer 33, the third layer 35, and the fourth layer 37 substantially have the same structures as the first layer 31.

Along a direction from the light emitting surface 13 to the top surface 301, refraction indices of the first to fourth layers 31, 33, 35, 37 gradually decrease, and the refraction index of the first layer 31 is not greater than the refraction index of the main body 11. In this embodiment, a refraction index $n_2$ of the first layer 31 is equal to 1.5, a refraction index $n_3$ of the second layer 33 is equal to 1.45, a refraction index $n_4$ of the third layer 35 is equal to 1.4, and a refraction index $n_5$ of the fourth layer 37 is equal to 1.35. The refraction index of the first layer 31 is equal to the refraction index of the main body 11, thus when light enters the first layer 31 from the main body 11, no coupling loss will occur.

The micro-rods 30 are made of transparent glue. Different glues having different refraction indexes can be used to form the different layers.

Light emitted from the light emitting surface 13 enters the micro-rods 30 and is emitted from each top surface 301 and each side surface 303. As the refraction index of any micro-rod 30 is greater than the refraction index of air, more light can be emitted from the light emitting surface 13.

For example, light with an initial incident angle of $\alpha_1$ is transmitted from the main body 11 to the first layer 31; when the light reaches the side surface 315, as the side surface 315 is perpendicular to the light emitting surface 13, the incident angle of the light changes into $90°-\alpha_1$. Since the refraction index of the first layer 31 is equal to 1.5, if the light is emitted from the side surface 315 to the air, then according to Snell's refraction law, the following inequality must be present: $1.5 \times \sin(90°-\alpha_1) < 1 \times \sin 90°$. From the above inequality, $\alpha_1 > 48.2°$ must be true. Thus, light with an initial incident angle greater than 48.2° can be emitted from the side surface 315 of the first layer 31.

Light with an initial incident angle of $\alpha_2$ is transmitted from the main body 11 to the first layer 31, and refracted into the second layer 33. As the refraction index of the first layer 31 is equal to 1.5, and the refraction index of the second layer 33 is equal to 1.45, according to Snell's refraction law, a departure angle of the light changes into $$\arcsin\frac{1.5 \times \sin\alpha_2}{1.45},$$

and when the light reaches a side surface of the second layer 33, the incident angle of the light changes into $$90° - \arcsin\frac{1.5 \times \sin\alpha_2}{1.45}.$$

As the refraction index of the second layer 31 is equal to 1.45, if the light can be emitted from the side surface to the air, then according to Snell's refraction law, the following inequality must be present:

$$1.45 \times \sin\left(90° - \arcsin\frac{1.5 \times \sin\alpha_2}{1.45}\right) < 1 \times \sin 90°.$$

It can be calculated from the above inequality that $\alpha_2 > 44.4°$. Thus, light with an initial incident angle in a range of 44.4°~48.2° can be emitted from the side surface of the second layer 33.

Similarly, it can be calculated that light with an initial incident angle in a range of 40.7°~44.4° can be emitted from a side surface of the third layer 35, and light with an initial incident angle in a range of 37.1°~40.7° can be emitted from a side surface of the fourth layer 37.

Furthermore, it also can be calculated that light with an initial incident angle smaller than 41.8° will be emitted from the top surface 301 of the micro-rod 30.

As the refraction index of the micro-rods 30 is gradually reduces, and the side surface 303 changes the incident angle of the light, light with an initial incident angle of more than 41.8° can be emitted from the side surface 303. Thus, the light emitting efficiency of the light guide plate 10 is significantly enhanced.

Figure 3:
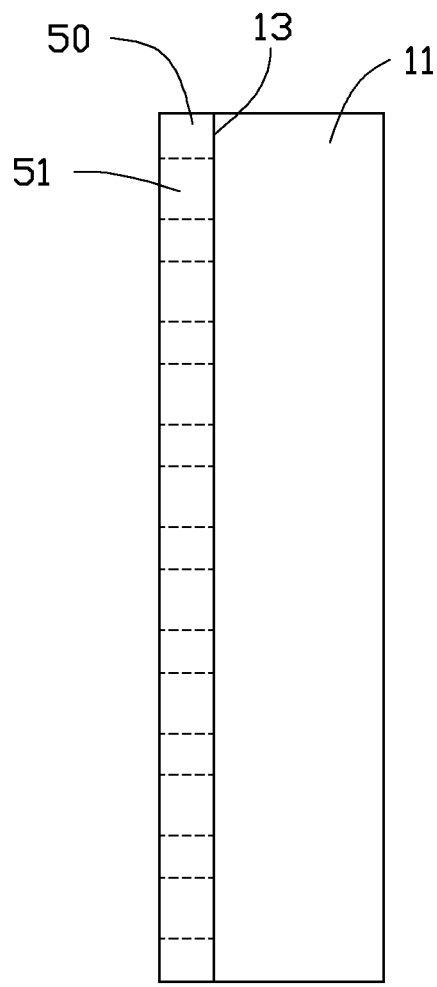
FIGS. 3 and 4 are schematic views showing a method of manufacturing the light guide plate of FIG. 1 according to a second embodiment of the present disclosure.
Figure 4:
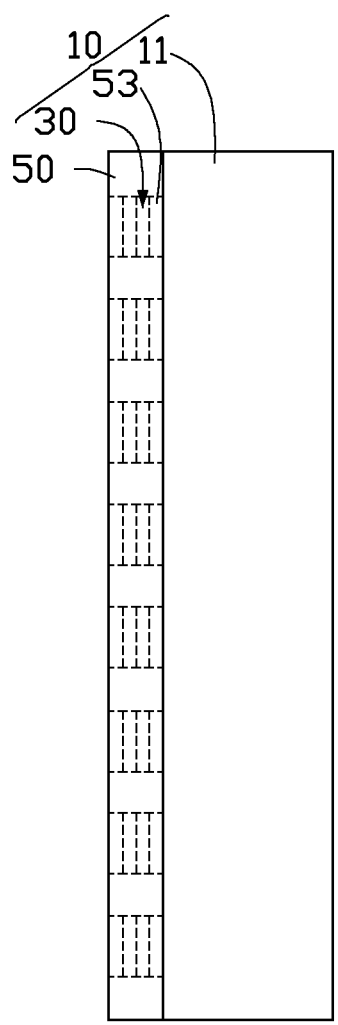

FIGS. 3 and 4 show a method for manufacturing the light guide plate 10. The method includes the following steps.

In step S01, a main body 11 and a plate 50 are provided. The main body 11 includes a light emitting surface 13. The plate 50 defines an array of holes 51. The plate 50 contacts the light emitting surface 13.

In step S02, multiple layers of transparent glue 53 are applied in the holes 51 and are cured to obtain the micro-rods 30 with multi-layer structure. Each layer of the glue 53 is coated onto the layer underneath when the glue 53 is cured. A refraction index of each layer of glue 53 is smaller than a refraction index of the previous layer of glue 53, and the maximum refraction index of any glue 53 is not greater than the refraction index of the main body 11.

In step S03, the plate 50 is removed and the light guide plate 10 of FIGS. 1 and 2 is obtained.

It will be understood that the above particular embodiments are shown and described by way of illustration only. The principles and the features of the present disclosure may be employed in various and numerous embodiments thereof without departing from the scope of the disclosure. The above-described embodiments illustrate the scope of the disclosure but do not restrict the scope of the disclosure.

What is claimed is:

1. A light guide plate comprising:
   a main body comprising a light emitting surface; and
   a plurality of spaced micro-rods on the light emitting surface, each of the micro-rods comprising a top surface on its distal end and a side surface connecting the top surface to the light emitting surface, and comprising a number of layers arranged in an order from the light emitting surface to the top surface, a refraction index of each layer being smaller than a refraction index of previous layer along the direction from the light emitting surface to the top surface, a maximum refraction index of each of the micro-rods being not greater than a refraction index of the main body, each of the micro-rods comprising the first layer, a second layer, a third layer, and a fourth layer.

2. The light guide plate of claim 1, wherein each of the micro-rods comprises a first layer directly formed on the light emitting surface, and a refraction index of the first layer is equal to the refraction index of the main body.

3. The light guide plate of claim 1, wherein the main body comprises a bottom surface opposite to the light emitting surface.

4. A backlight module comprising:
   a light guide plate comprising:
      a main body comprising a light emitting surface, a bottom surface opposite to the light emitting surface, and a light incident surface connecting the light emitting surface to the bottom surface; and
      a plurality of spaced micro-rods on the light emitting surface, each of the micro-rods comprising a top surface on its distal end and a side surface connecting the top surface to the light emitting surface, and comprising a number of layers arranged in an order from the light emitting surface to the top surface, a refraction index of each layer being smaller than a refraction index of previous layer along the direction from the light emitting surface to the top surface, a maximum refraction index of each of the micro-rods being not greater than a refraction index of the main body, each of the micro-rods comprising the first layer, a second layer, a third layer, and a fourth layer;
   a reflection plate adjacent to the bottom surface; and
   a light source facing the light incident surface.

5. The backlight module of claim 4, wherein each of the micro-rods comprises a first layer directly formed on the light emitting surface, and a refraction index of the first layer is equal to the refraction index of the main body.

6. A method for manufacturing a light guide plate, comprising:
   providing a main body and a plate, the main body comprising a light emitting surface, the plate defining an array of holes, the plate touching the light emitting surface;
   coating multiple layers of transparent glue in the holes;
   curing the glue to obtain a number of micro-rods directly formed on the light emitting surface, wherein along a direction away from the light emitting surface, a refraction index of each layer of the transparent glue is smaller than a refraction index of a previous layer of the transparent glue, and a maximum refraction index of the transparent glue is not greater than a refraction index of the main body; and
   removing the plate to obtain the light guide plate.

* * * * *